United States Patent [19]
Bürger et al.

[11] Patent Number: 6,097,489
[45] Date of Patent: Aug. 1, 2000

[54] OPTOELECTRONIC SENSOR ARRANGEMENT WITH A PLURALITY OF PHOTOSENSITIVE ELEMENTS ARRANGED IN ONE LINE OR IN AN ARRAY

[75] Inventors: Jürgen Bürger, Nimburg; Gerhard Alt, Sexau; Günther Geissler, Heuweiler; Winfried Sekat, Waldkirch, all of Germany

[73] Assignee: Sick AG, Waldkirch, Germany

[21] Appl. No.: 09/069,050

[22] Filed: Apr. 28, 1998

[30] Foreign Application Priority Data

Apr. 30, 1997 [DE] Germany .......................... 197 18 389
Jun. 27, 1997 [DE] Germany .......................... 197 27 459

[51] Int. Cl.⁷ .................................................. G02B 21/18
[52] U.S. Cl. ...................... 356/372; 356/222; 356/400; 356/343
[58] Field of Search .................. 356/372, 222, 356/400, 343

[56] References Cited

U.S. PATENT DOCUMENTS

| | | |
|---|---|---|
| 4,102,580 | 7/1978 | Fletcher et al. .......................... 356/446 |
| 4,553,847 | 11/1985 | Lang ....................................... 356/445 |
| 5,596,187 | 1/1997 | Di Stefano . |
| 5,657,120 | 8/1997 | Smith .................................... 356/301 |

FOREIGN PATENT DOCUMENTS

| | | |
|---|---|---|
| 3429943C2 | 11/1988 | Germany . |
| 2939139C2 | 10/1989 | Germany . |
| 3627972C2 | 2/1992 | Germany . |
| 4236618A1 | 5/1994 | Germany . |
| WP 90/01173 | 2/1990 | WIPO . |
| WO 90/02347 | 3/1990 | WIPO . |

OTHER PUBLICATIONS

Medernach, Christophe, "Triangulation in Echtzeit", in: *F & M Messen, Steuern, Regeln*, 103, 1995, 10, pp. 640–641.

*Primary Examiner*—Robert Kim
*Assistant Examiner*—Reginald A. Ratiff
*Attorney, Agent, or Firm*—Townsend and Townsend and Crew LLP

[57] ABSTRACT

An optoelectronic sensor arrangement comprising a light transmitter for the transmission of sequential operational light pulses into a monitored region and with a light receiver unit for the reception of operational light pulses reflected from an object located in the monitored region, wherein the light receiver unit includes at least two photosensitive elements, with a circuit for the suppression of stray light being associated with each photo-sensitive element.

30 Claims, 4 Drawing Sheets

OPTOELECTRONIC SENSOR ARRANGEMENT WITH A PLURALITY OF PHOTOSENSITIVE ELEMENTS ARRANGED IN ONE LINE OR IN AN ARRAY

FIELD OF THE INVENTION

The invention relates to an optoelectronic sensor arrangement comprising a light transmitter for the transmission of sequential operational light pulses into a monitored region and a light receiver unit for the reception of operational light pulses reflected from an object located in the monitored region.

DESCRIPTION OF PRIOR ART

In such sensor arrangements the light receiver units can, for example, in-clude a plurality of photosensitive elements so that, after a suitable evaluation of the signal delivered by the photosensitive elements, conclusions can be drawn on the position of the reflecting object in the monitored region.

These sensor arrangements are known from the prior art as PSDs (position sensitive detectors) or as CCDs, which are, for example, used in video cameras, and have the common disadvantage that only an inadequate filtering of stray light, in particular of steady light, is possible. PSDs permit a restricted filtering of stray light as a result of a saturation which already sets in early. CCDs enable only the removal of stray light, in particular of steady light, by a subtraction of a stray light value, which takes place in accordance with the actual light reception and which is averaged over all the photosensitive elements. Moreover, it is a disadvantage with PSDs that it is always only one single object that can be recognized at a specific point in time.

As a result of the above described disadvantages, the industrial use of the sensors known from the prior art is only very restricted, and indeed to an industrial use in which, for example, an effective and reliable suppression of stray light, which occurs in industrial applications with a considerable dynamic signal range, is essential.

OBJECT OF THE INVENTION

An object of the invention is to further develop an optoelectronic sensor arrangement of the initially named kind in such a way that an improved suppression of stray light, in particular of steady light, is possible.

BRIEF DESCRIPTION OF THE INVENTION

In accordance with the invention this object is satisfied in that, in an optoelectronic sensor arrangement of the named kind, in which the light receiver unit includes at least two photosensitive elements, a circuit for stray light suppression is associated with each photosensitive element. In accordance with the invention, each photosensitive element is thus equipped with its own, separate, stray light suppression circuit.

The principle of the invention makes a particularly reliable and effective suppression of stray light possible. For example, this suppression of stray light also enables a more reliable recognition of operational light signals when the dynamic range of the operational light signal is significantly smaller than the dynamic range of the stray light. In particular it is, for example, possible—in accordance with the invention—to reliably recognize operational light signals with a comparatively low dynamic range of, for example, up to $10^3$ with a stray light dynamic range of $10^7$. This is also possible when the stray light has amplitudes which lie several decades higher than the amplitudes of the operational light.

Furthermore, it is advantageous with the optoelectronic sensor arrangement of the invention that as a result of the stray light suppression, which takes place separately in each cell of a row or an array, i.e. with respect to each photosensitive element, differently illuminated background surfaces can have no negative effects on the evaluation of the operational light signal. The received operational light always provides correct information concerning the reflectivity of objects or of background elements in the monitored region, in accordance with the invention, independently of the manner in which these objects or background elements are illuminated by stray light. If, for example, an object is present in the monitored region, and the light transmitted from the optoelectronic sensor arrangement of the invention is reflected from a background surface with uniform, homogenous reflectivity, then the background surface also delivers a constant received signal representing its homogenous reflectivity when specific regions of the background surface are more strongly illuminated by stray light than other regions. Inhomogenous illuminations of the background surface are thus neutralized in accordance with the invention.

The stray light suppression in an optoelectronic sensor in accordance with the invention can be additionally improved in that only relatively short operational light pulses, in particular light pulses of high energy, are transmitted. The duration of the operational light pulses can in this respect, for example, lie in the nanosecond range.

The pulse duration of the operational light signal can preferably amount to between 1 $\mu$s and 20 $\mu$s. It is of advantage if the inverse value of the pulse duration of the operational light lies approximately two orders of magnitude above the highest prevailing disturbing light frequency, since then a particularly reliable suppression of stray light or disturbing light is possible.

As a result of the stray light suppression in accordance with the invention it is possible to provide a linear transmission behavior instead of a logarithmic transmission behavior of the sensor, which is known from the prior art, i.e. current delivered by the photosensitive elements of the invention for the operational light which is received can have a shape proportional to the degree of reflection or remission of the objects and elements located in the monitored region. The use of a sensor arrangement in accordance with the invention is particularly advantageous if a number of photosensitive elements are provided alongside one another in a row arrangement or in a matrix arrangement. With a matrix arrangement in particular it is possible, in accordance with the invention, not only to determine the presence of an object in the monitored space but rather also its position.

In a preferred embodiment of the invention, each of the circuits for the suppression of stray light has a regulated energy source connected to the respective photosensitive element, in particular a current source. This energy source thereby delivers the current which flows through the photosensitive element, which corresponds in the pauses between the operational light pulse transmissions to the stray light that is present. The current delivered by the said energy source is then also kept, in accordance with the invention, during the transmission of the operational light signal, at that value which corresponds to the last found value, or to the variation of the stray light extrapolated into the time region of an operational light signal transmission.

The current which additionally flows through the photosensitive element during the reception of the operational light is drawn from another energy source, in particular a capacitor, with the measurable value of this additional current then ultimately corresponding to the operational light that is received.

In order to realize the named principle of the operational signal determination, the regulation of the energy source can be switched on in the pauses between the transmission of the operational light pulses and can be switched off during the transmission of the operational light pulses.

In just the same way it is, however, also possible to make the regulation at the time of transmission of the operational light pulses variable relative to the regulation in the pauses between the transmission of the operational light pulses. It is in particular possible to bring about the change of the regulating behavior through activation and deactivation of at least one filter of a regulating circuit. In this respect a filter with a short time constant can be activatable in the pauses between the transmission of the operational light pulses, whereas a filter with a longer time constant can be activatable during the transmission of the operational light pulses.

Through this latter manner of proceeding, an extrapolation of the current delivered from the energy source can be achieved during the transmission of the operational light pulses in dependence on the variation of the current in the intervals between the transmission of the operational light, so that the stray light compensation can be additionally improved.

Each of the circuits for the suppression of stray light can be provided with a storage element for the storage of the operational light component received by the photosensitive element, with the storage element in particular being executed as a capacitor.

During the reception of the operational light pulse, the storage element can be coupled via a switch to the photosensitive element, so that the amplitude of the received operational light is transferred into the storage element.

It is of advantage if all storage elements can be simultaneously coupled to the photosensitive elements respectively associated with them, so that rapid movements of objects in the monitored region can also be correctly detected. The said simultaneous coupling of the storage elements to the photosensitive elements thus enables correct and instantaneous records of the monitored region freed of stray light.

In order to enable a continuous monitoring of the monitored region, and to make sequential, instantaneous records of the monitored region available at short time intervals, the storage element of each of the circuits provided for stray light suppression can be coupled to a resetting circuit activatable during the pause between the transmission of the operational light pulses. Thus, all the storage elements that are present can be reset to a neutral value again, after an instantaneous record has been made, and after the stored values have been made available to an evaluation circuit, so that the storage elements are thus made ready for the storage of a new operational light signal value.

The storage elements that are provided can be connected via a switch, in particular an addressable switch, to one or more sample-and-hold circuits, to a comparator circuit or to an A/D-converter.

On transfer of the values stored on the storage elements into a sample-and-hold circuit, a situation is achieved in an advantageous manner in which the information determined with the sensor arrangement concerning the monitored region can be read out and evaluated in a manner which is non-critical with respect to time. In particular it is possible to further process a value stored in a sample-and-hold circuit while new values are again already being stored in the storage elements.

With the provision of suitable comparator circuits, or an A/D-converter, to which the values of the storage elements are passed, it is possible to make a pronouncement concerning the amplitude of the value stored in the storage elements and thus of the gray values of an image which was detected with a sensor arrangement in accordance with the invention, for example with an instantaneous record of the named kind. The resolution of the gray values can be adapted to the respective requirements. For example, it is possible in certain cases, in the context of data reduction, to straightforwardly reduce the values stored in the storage elements and having a plurality of different amplitudes to a few gray stages significant for the respective application.

When using a comparator circuit it is of advantage when this has an adjustable threshold value, since in this manner a situation can be achieved in which the threshold value, which is ultimately the determining factor for the light quantity received, above which light reception is actually signaled, can be adapted to the respectively prevailing conditions. In particular it is possible in this case, in the context of a teaching procedure which takes place prior to the actual measurement, to adapt the threshold value of the comparator to the respectively prevailing contrast conditions.

Through the provision of the adjustable threshold value and the insertion of a teaching procedure, the use of an A/D-converter can be spared in advantageous manner, which in addition leads to a maximum data reduction to only two values (light received yes/light received no).

A particularly economical use of a sensor arrangement in accordance with the invention is possible when all the photosensitive elements of the light receiver unit are arranged on a single chip. In just the same way all the circuits for the suppression of stray light can likewise be arranged on the said chip, so that the entire sensor arrangement of the invention can be integrated onto a single chip.

The photosensitive elements of the light receiver unit can be arranged equidistantly spaced apart from one another or directly bordering on one another. Thus, geometrical conditions can be achieved which correspond to those of CCD arrays, with both large and also small receiver sizes, i.e. photosensitive elements with large and small receiver surfaces can be realized. It is in particular possible to arrange the photosensitive elements so closely alongside one another that a photosensitive surface with almost 100% filling results.

The photosensitive surfaces of the elements provided can have different geometrical shapes, with the shape being adaptable to the respectively given requirements. Finally, it is also possible to insert respective color filters in front of the photosensitive elements, in particular color filters of adjustable transmission frequency. In this manner the sensor arrangement of the invention can also be exploited as a multi-dimensional color recognition system.

In order to enable a reliable color recognition, it is, for example, possible to always provide three photosensitive elements, which border on one another, with different color filters, so that a unit comprising three photo-sensitive elements is in each case always suitable for the recognition of a color pixel.

Alternatively it is also possible to place a respective adjustable color filter in front of all photosensitive elements, so that, for example, three instantaneous records of the monitored region, each with differently set color filters, can be recorded at short sequential time intervals, with these three instantaneous records then being capable of being put together to form a color image.

The invention also comprises an embodiment in which the light receiver unit includes only one photosensitive element, with which a circuit is associated for the suppression of stray light and which is specifically designed in accordance with the above described features, or which corresponds to the circuit, which will be explained in the context of the subsequent description of the drawings.

In an advantageous method for the operation of an opto-electronic sensor arrangement of the described kind, the position, the movement, the height profile including possible oblique flanks and/or the contrast of an object located in the monitored region is determined by means of an evaluation circuit. An evaluation circuit which is in the position of being able to realize one or more of the above named functions, enables diverse possibilities of use of the sensor arrangement of the invention. It is of advantage if the evaluation circuit can realize a plurality of functions, between which the user of a sensor arrangement can switch, without a new programming of the sensor arrangement being required for this purpose. This switchover function can, in particular, be realized by a selection switch.

When determining the position, the movement, the height profile or the contrast of an object by means of the sensor arrangement of the invention, it is of advantage if the respective object is actively illuminated, in particular with a defined light intensity, since in this manner a reliable recognition and fault-free evaluation can be ensured.

In this connection it is pointed out that the sensor arrangement can in principal also be operated without an active light transmitter, and in this case outside light or environmental light is reflected from the object located in the monitored region to the light receiver unit, or the object itself is formed as a light source. Outside light or environmental light should, in this case, however, have the required time synchronization. For this possible use the light receiver unit also comprises at least two photosensitive elements, with a circuit for the suppression of stray light being associated with each photosensitive element.

Two possible cases of use of a sensor arrangement in accordance with the invention operated with an active light transmitter are to be distinguished.

In a first case of use, a reflector which bounds the monitored region, is provided at the end of the monitored region opposite to the sensor and serves to reflect light transmitted from the light transmitter of the sensor arrangement back to the receiver. This is, for example, sensible with large distances at which it must be ensured that adequate light is reflected back to the receiver.

In a second case of use, no reflector which bounds the monitored region is provided at the end of the monitored region opposite to the sensor arrangement. This is, for example, sensible with short distances or when an object to be recognized has adequate reflection characteristics.

When using the above mentioned reflector, it is sensible to pivot and/or shift the reflector with an object-free monitored region, prior to taking the sensor arrangement into operation, until all the photosensitive elements of the light receiver unit signalize the reception of light. Through this alignment of the reflector, a situation is achieved in which it can be assumed, when all the photosensitive elements signalize the reception of light in the operation of the sensor arrangement, that no object is present in the monitored region. When an object is introduced into the monitored region, then it prevents a part of the radiation transmitted by the light transmitter reaching the reflector and thus also being reflected back to the light receiver unit. In just the same way, translucent or transparent objects introduced into the monitored region bring about an attenuation of the radiation. The corresponding photosensitive elements of the light receiver unit will then signalize either no light reception or low light reception, whereby a conclusion can be drawn regarding the presence of an object in the monitored region, and in particular with respect to its position.

The principle of the invention can, for example, be used in a sensor in accordance with the light intersect method in order to determine the presence, the position, the height or the total profile of an object. In this respect the light transmitter of the sensor arrangement is operated so that it, for example, transmits a V-shaped light beam lying essentially in one plane, which produces a reflecting line, the so-called light intersect, on the surface of an object present in the monitored region. Furthermore, it is possible with the principle of the invention to realize a catenary regulation of a flexible object, for example of a thread or of a band, in that the deflected region of the flexible object is introduced into the monitored region of the sensor arrangement.

Furthermore, the principle of the invention can be used to find the edges of objects, lines, the spacings or gaps between two objects, or the width, the length or the size of an object. In this arrangement the objects can in particular be located on a conveyor means which transports them. The use of the principle of the invention thereby leads in an advantageous manner to a rapid possibility of evaluation, to the possibility of the selectable adjustment of recognition and tolerance ranges, to the possibility of the detection of small differences in contrast, in particular by means of the teaching method, and also to the possibility of recognizing smaller objects, lines, or gaps.

Moreover, it is possible to use the principle of the invention to monitor a stationary state, in particular the position of one or more objects, with a warning signal always being transmitted when the position of an object lies outside of a predetermined tolerance range.

It is also possible to use the principle of the invention for the recognition of one or more objects or object features with respect to their reflectivity, their shape, their dimensions, and/or their contour.

Transparent material can also be monitored in accordance with the principle of the invention, in particular with light. If, for example, a transparent material is being monitored in the context of a catenary regulation, then the lower edge of the downwardly hanging material results in a certain path in the direction of light propagation, through which both the transmitted and also the reflected light must pass. Thus, a greater absorption or reflectivity is present in this region of the lower edge than in the remainder of the downwardly hanging material, or in the region located beneath the downwardly hanging material. As a consequence, less light is reflected to the light receiver in the region of the said edge than in the remaining regions, whereby the lower edge of the deflected material can be detected by means of the principle of the invention.

One can proceed analogously if, for example, transparent bottles are to be detected. In this case the light will pass over a relatively long measurement path in the transparent material when passing substantially radially through the bottle walls, both during the transmission and also during the reflection of the light, so that here a larger absorption or reflection of the light takes place than in the remaining regions of the bottle or in those regions in which no bottles are present. Thus, the outer sides or the "edges" of the bottles can be detected in accordance with the invention.

The use of the principle of the invention is in particular advantageous when the light transmitter can operate with different wavelengths or colors, so that, for example, the ideal wavelength for the recognition of contrast, for the recognition of an edge, for the recognition of an object, or for other detection processes can be learned, for example in the context of a teach-in method.

Finally, the principle of the invention can also be used for the recognition of one or two dimensional codes, in particular of a bar code or of a script. In the same way, infinitely many further possibilities of use of the principle of the invention can be realized.

Further preferred embodiments of the invention are set forth in the subordinate claims.

BRIEF LISTING OF THE FIGURES

The invention will subsequently be described with reference to embodiments and to the drawings, in which are shown.

DESCRIPTION OF PREFERRED EMBODIMENTS

Figure 1:
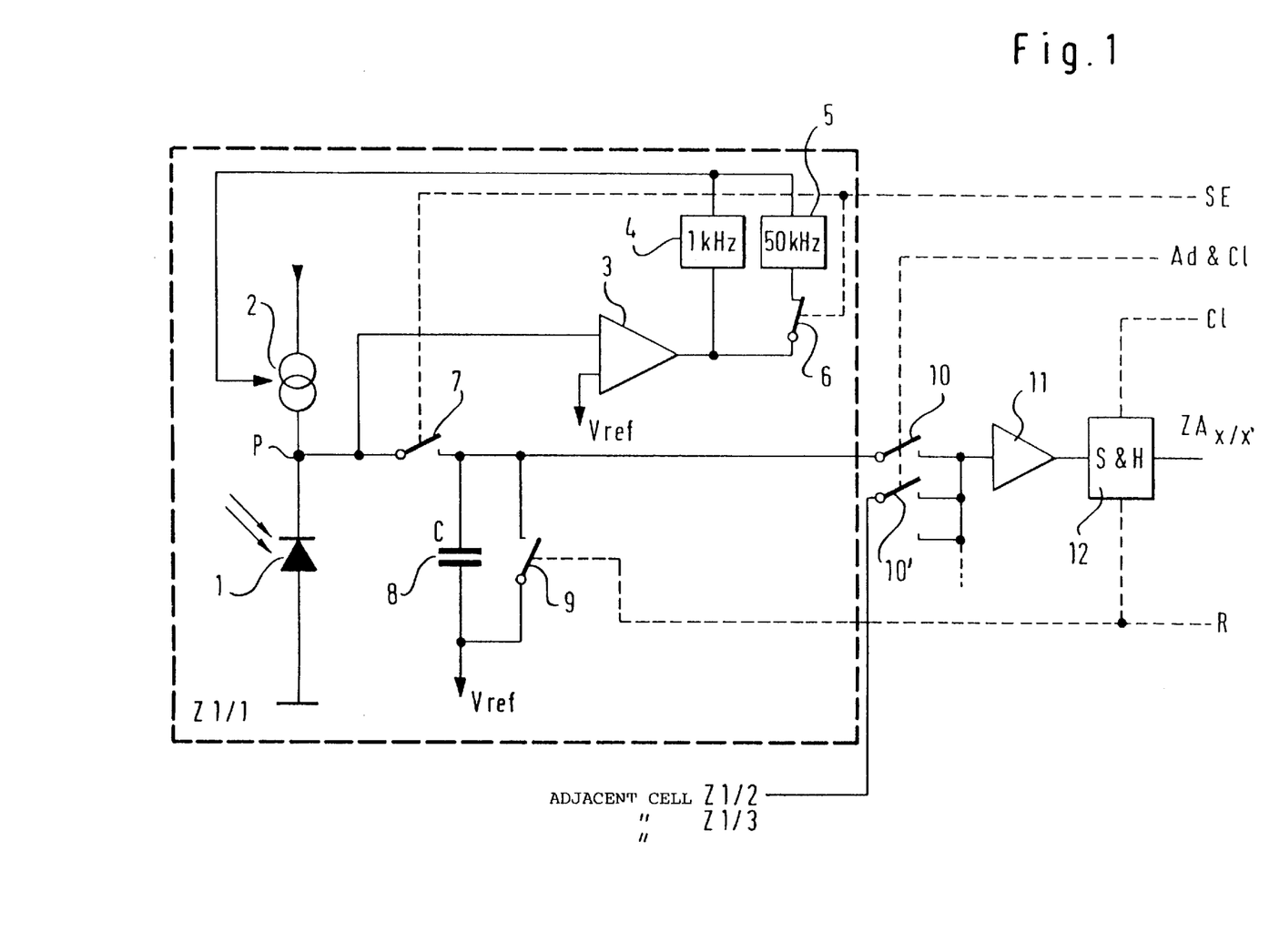
FIG. 1 a circuit diagram of the principle of a cell of a sensor arrangement in accordance with the invention, of which at least two are contained in a sensor arrangement in accordance with the invention, FIG. 2 a diagram illustrating the principle of a sensor arrangement of the invention used to determined a light intersect, FIG. 3 a diagram illustrating the principle of a sensor arrangement in accordance with the invention used for the regulation of a deflection, FIG. 4 a diagram illustrating of the principle of a sensor arrangement in accordance with the invention used for object recognition, FIG. 5a the outline of an object in plan view which is to be recognized with an apparatus in accordance with FIG. 4 and having regions of different brightness, and FIGS. 5b–d images delivered by a sensor in accordance with the invention with respect to the object of FIG. 5a, with different settings of the contrast steps to be recognized.

In accordance with the invention a plurality of cells of the type shown in FIG. 1 can be arranged in a row or in an array.

The cell shown in FIG. 1 has a photosensitive element formed as a photodiode 1 which is connected at one end to earth and at the other end to a current source 2. The potential point P common to the photodiode 1 and the current source 2 is coupled to the input of a regulator 3, the output of which is connected via two filters 4, 5 connected in parallel, and in particular each formed as a low-pass filter, to the control input of the current source 2, so that the regulator 3 ultimately causes the potential point P between the current source 2 and the photodiode 1 to be kept at a potential $V_{ref}$ which is applied to the second input of the regulator 2.

The first filter 4 has a time constant equivalent to 1 kHz and is connected directly between the output of the regulator 3 and the regulating input of the current source 2. The second filter 5 has a time constant equivalent to 50 kHz and is likewise connected between the output of the regulator 3 and the regulating input of the current source 2, with a control switch, however, being provided between the output of the regulator 3 and the input of the filter 5.

The common potential P of the photodiode 1 and of the current source 2 is connected via a likewise controllable switch 7 to one pole of the capacitor 8, the other pole of which lies at the potential $V_{ref}$.

A controllable resetting switch 9 is provided parallel to the capacitor 8.

The pole of the switch 7 adjacent the capacitor 8 is coupled via a further switch 10 to the input of an amplifier 11, the output of which is supplied to the input of the sample-and-hold circuit 12.

The switches 6 and 7 are acted on by a common control input SE, i.e. the two switches can be actuated by the control signal SE at the same time, with the switch 7 always being open when the switch 6 is closed and vice versa.

A plurality of switches 10, 10' etc. are coupled to the input of the amplifier 11, of which each is associated with a respective cell shown in FIG. 1. Thus, when the switches 10, 10' etc. are actuated sequentially one after the other, the values stored in the capacitors 8, 8' etc. can be stored sequentially one after the other in the illustrated sample-and-hold circuit 12. An address and clock line Ad & Cl is provided for the sequential actuation of the switches 10, 10' one after the after, by which the respective one of the switches 10, 10' etc. can be addressed and actuated.

The clock component of the signal Ad & Cl is applied as a signal Cl to the clock input of the sample-and-hold circuit 12 in order to clock this accordingly and to take care of the timely correct reading in of the values stored in the capacitors 8, 8' etc.

Finally, a resetting line R is provided, by means of which the switch 9 can be actuated and closed, on the one hand, and the sample-and-hold circuit 12 can be reset, on the other hand. In the operation of the described circuit, the switches 6, 7, 9, 10 and 10' are located in the position shown during the pauses between the transmission of the operational light pulses.

The manner of operation of the above explained circuit is as follows:

In the pauses between the transmission of the operational light pulses the regulating circuit consisting of the elements 2–6 is active, with the filter 5 with the time constant of 50 kHz being the determining factor here. This signifies that the regulating circuit follows rapid changes at the potential point P, which are caused by environmental light via the photodiode 1. In the named pauses between the transmission of the operational light pulses, the explained regulating circuit with a time constant of 50 kHz consequently ensures that the potential point P is kept at the potential $V_{ref}$ independently of the amplitude and frequency of the environmental light. The capacitor 8 is charged up to the potential $V_{ref}$ with the switched positions shown in the drawing, i.e. charge is stored in the capacitor 8. When reception of an operational signal is to take place, the signal SE acts on the two switches 6 and 7 in such a way that the switch 6 is opened and the switch 7 is closed.

Through the opening of the switch 6 the filter 5 is set out of operation, which signifies that only the filter 4 with a time constant of 1 kHz is active. The described regulating circuit thus only follows slow signal changes and brings about a situation at the potential point P in which a regulation which is active prior to the opening of the switch 6 is only continued for disturbing signals with correspondingly low frequency.

In an alternative embodiment of the invention it is possible to operate without the filter 4, which signifies that the regulation function of the described regulating circuit is taken fully out of action during the reception of the operational signal. In this case no extrapolation of the environmental light into the time region of the reception of the operational signal takes place, and only the value of the environmental light is compensated which prevailed before the reception of the operational signal.

The closing of the switch 7, which takes place directly before the reception of the operational signal, causes the additional current which flows through the photodiode 1 and which is caused by the operational light to be drawn from the capacitor 8 or from the charge stored in this capacitor 8.

During the reception of the operational signal a current, which is delivered by the power source 2, thus flows through the diode 1, on the one hand, as does also a current which is delivered by the capacitor 8, on the other hand. In this respect the current which is delivered from the power source 2 corresponds to the environmental light and the current which is delivered by the capacitor 8 corresponds to the operational light.

After reception of the operational signal, the switch 7 is opened again via the signal SE and the switch 6 is closed.

Through the opening of the switch 7 it is ensured that no further charges are withdrawn from the capacitor 8, so that the charge which was withdrawn from the capacitor 8 during the reception of the operational signal ultimately corresponds to the operational light component. The charge difference of the capacitor 8 between the time point of closing the switch 7 and the time point of opening the switch 7 is thus a measure for the operational light which is received.

By addressing and energizing the switch 10 via the signal Ad &Cl, the said charge difference of the capacitor 8 is supplied via the amplifier 11 to the sample-and-hold circuit 12, where a storage of this difference signal takes place. The value stored in the sample-and-hold circuit 12 can then be further processed in any desired manner.

After reading out the stored value from the sample-and-hold circuit 12, the latter is reset by means of the signal R, with closing of the switch 9 simultaneously taking place, whereby the capacitor 8 is brought back to the potential $V_{ref}$ again, so that—after subsequent opening of the switch 9—the capacitor 8 is ready for a new reception of the operational signal. The resetting of the sample-and-hold circuit 12 and the closing of the switch 9 can alternatively take place at different times.

In accordance with the invention, a plurality of the cells shown in the drawing are used, with it being preferred when these cells are simultaneously activated by the signal SE, so that the reception of the operational light takes place simultaneously in all cells. The reading out of the difference charges stored in the respective capacitors 8, 8' etc. can then take place timewise one after the other by corresponding addressing and actuation of the switches 10, 10' etc.

Figure 2:
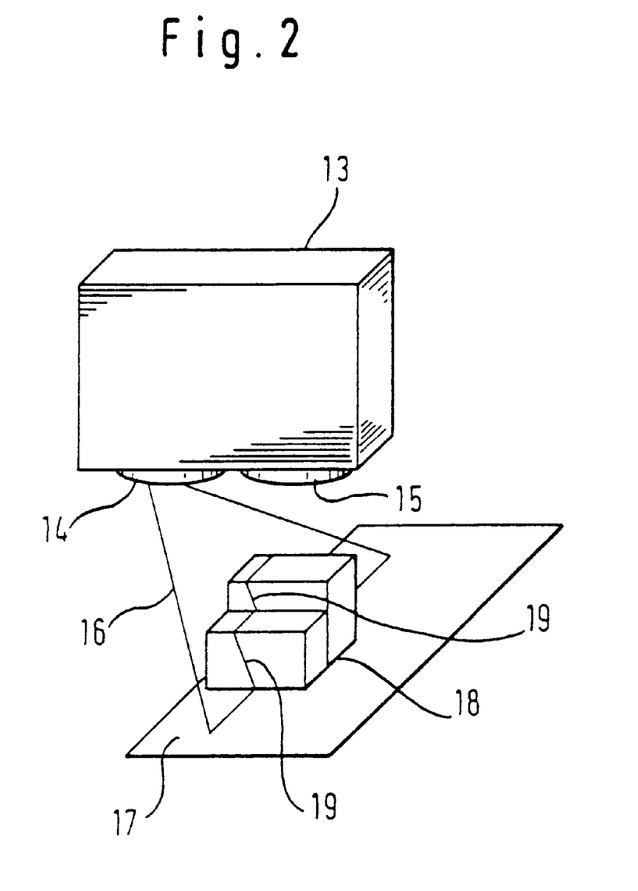

FIG. 2 shows an optoelectronic sensor arrangement 13 in accordance with the invention which is accommodated in a square shaped housing, which has an optical transmitting system 14 on one of its long, narrow sides, and also an optical receiving system 15 arranged alongside the optical transmission system.

A light transmitter is provided in the housing behind the optical transmitting system 14. In just the same way a light receiver unit with a plurality of photosensitive elements arranged in a matrix is arranged behind the optical receiving system 15.

The light transmitter and the optical transmitting system 14 are formed in such a way that they transmit a V-shaped light beam bundle in a plane 16, which extends through the monitored region in the direction of the plane 17, which bounds the monitored region at the side opposite to the sensor arrangement 13.

The plane 17 does not necessarily need to be a stationary element arranged at the end of the monitored region, but can, for example, be formed by conveyor means, on which objects are transported through the monitored region.

An object 18 is located on the plane 17 which is, for example, formed as a conveyor means and consists of two parallelepipeds of different size arranged alongside one another.

The light beam transmitted by the light transmitter is directed in the illustrated embodiment in such a way that it strikes the object 18 obliquely. It is important that the plane 16 of the transmitted light beam extends at an angle greater than 0° to the optical axis of the optical receiving system 15, so that it would also be possible for the transmitted light beam to strike the object 18 perpendicularly and to align the optical axis of the receiver obliquely in a corresponding manner.

The light beam which irradiates the object 18 in the said manner produces a line of light 19 on the object 18, the so-called light intersect.

When considered from the optical receiving system 15, this line of light 19 has the shape 20 shown in the lower region of FIG. 2. It can be seen from the illustration of the shape 20 in accordance with FIG. 2 that this shape 20 ultimately corresponds to the vertical profile of the object 18, with the region 38 of the shape 20 characterizing the smaller parallelepiped of the object 18, and the region 39 of the shape 20 characterizing the larger parallelepiped of the object 18.

Consequently, the vertical profile of the object can be determined with the sensor arrangement of the invention in simple manner by means of the light intersect method, with a high security against disturbing light being ensured as a result of the principle of the invention.

The object 18 mentioned in connection with FIG. 2 can also be shaped differently in any desired manner. For example, it can be a single object which has a specific processing state which is to be recognized in accordance with the invention. Thus, in accordance with the principle of the invention, it is, for example, possible to recognize whether an object is provided with a milled groove or whether the milled groove has the desired dimensions.

A typical application for the recognition of a plurality of objects consists in the scale counting of a stream of journals or newspapers laid overlapping one another in the manner of roof tiles. In this application only the difference from step to step is determined, with fluctuations in the height of the sensed journals or newspapers which arise through a vibration of the conveyor belt transporting the said objects being compensated for by the said relative measurement. The term relative measurement will be understood in this case to mean that only the steps of the overlapping stream, i.e. the vertical differences between two sequential journals or newspapers lying in rooftile-like manner on one another are determined.

Figure 3:
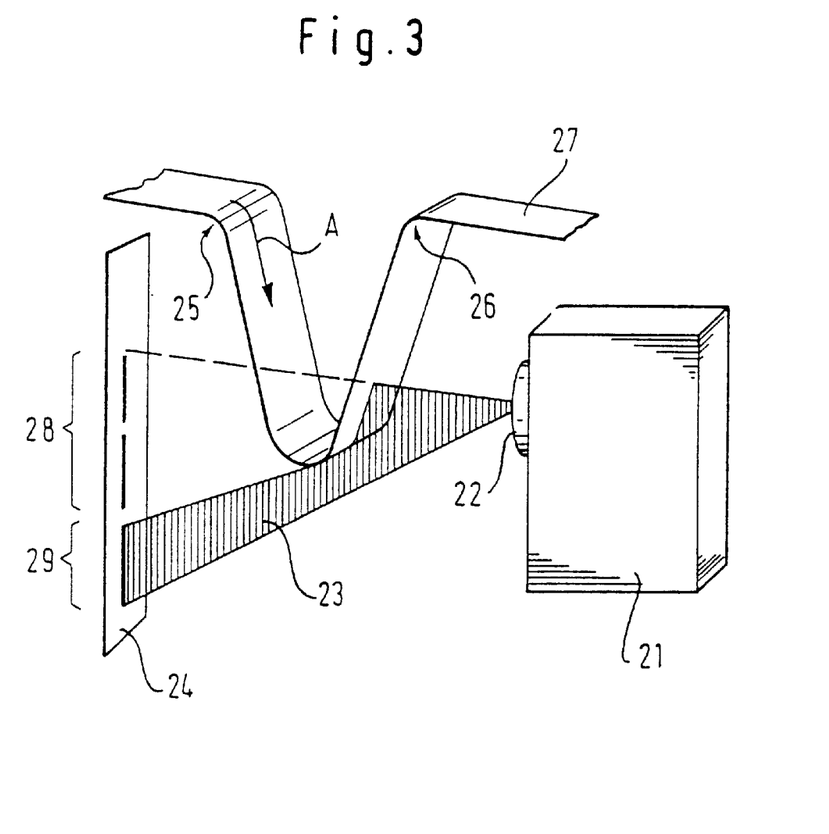

FIG. 3 shows a sensor arrangement 21 in accordance with the invention which is accommodated in a housing having the shape of a parallelepiped as is the sensor arrangement 13 in accordance with FIG. 2.

The sensor arrangement 21 has an optical autocollimation system 22, which is the responsible factor both for the transmitted radiation and also for the received radiation.

The sensor arrangement 21 transmits a V-shaped light beam 23 in the direction of the reflector 24, which reflects the transmitted light back to the sensor arrangement 21.

The monitored region is bounded on one side by the reflector 24, and on the other side by the sensor arrangement 21.

A flexible belt 27, which is in particular transported in the direction of the arrow A, projects into the monitored region, and can, for example, be supported at the positions 25 and 26 by non-illustrated transport rollers. In this arrangement the belt 27 hangs down between the positions 25 and 26 in such a way that it projects into the region of the light beam 23, and in this manner prevents the light transmitted by the sensor arrangement from all falling on the region 28 of the reflector. As a result of the downwardly hanging belt 27, light transmitted from the transmitter arrangement 21 only strikes the region 29 of the reflector, so that light is only reflected back to the sensor arrangement 21 from this region 29.

The ratio of the sizes of the reflector regions 28 and 29 changes, depending on the size of the loop of the belt 27 in the monitored region. The size of the region 29 can be found from the sensor arrangement 21 and ultimately represents a measure for the actual loop size of the belt 27.

Thus, a loop size regulation which is insensitive to disturbing light can be realized in a simple manner with the sensor arrangement of the invention The insensitivity is achieved in this respect—as also in the apparatus of FIG. 2—in that the light receiver unit used includes a matrix or a row with a number of photosensitive elements, with a separate respective circuit for the suppression of stray light being associated with each photosensitive element.

The V-shaped illumination of the belt 27 or of the reflector 24 described above in connection with FIG. 3 can alternatively also be replaced in advantageous manner by a telecentric illumination, which includes essentially only parallel light beams. The transformation of the V-shaped illumination into a telecentric illumination can, for example, be achieved by a concave mirror or by a lens.

Figure 4:
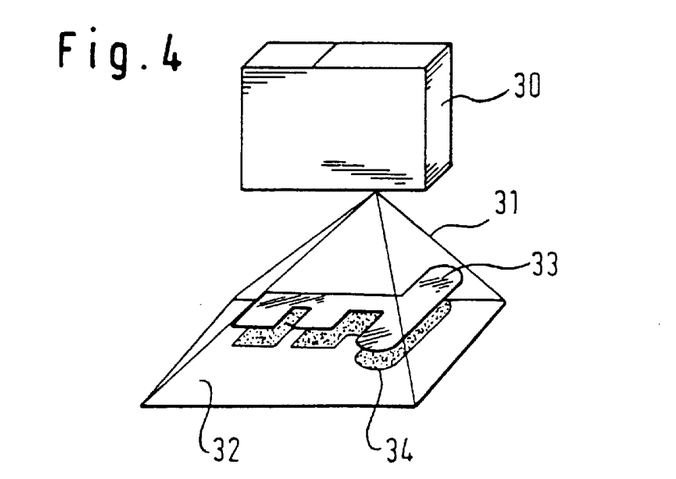

FIG. 4 shows an optoelectronic sensor arrangement 13 in accordance with the invention, which is accommodated in the same way as the sensor arrangement of FIGS. 2 and 3 in a housing having the shape of a parallelepiped.

The sensor arrangement 30 transmits a light beam 31 in the direction of the reflector 32, which reflects the transmitted light back to the sensor arrangement 30.

The light bundle 31 is formed in this respect in such a way that the entire surface of the reflector 32 is illuminated, so that each reflecting point on the reflector 32 can lead to a production of a corresponding signal in the sensor arrangement 30.

Between the reflector 32 and the sensor arrangement 30 there is located an object 33, the shadow 34 of which is formed on the reflector 32. In the region of the shadow 34 the reflector 32 consequently reflects no light back to the sensor arrangement 30, so that a distinction can be made in the sensor arrangement 30 between the shadowed and non-shadowed regions of the reflector 32. Thus, using the sensor arrangement 30 of the invention, the outline of the shadow 34 and thus the outline of the object 33 can be found, so that the arrangement shown in FIG. 4 is suitable for the recognition of any desired objects.

Figure 5:
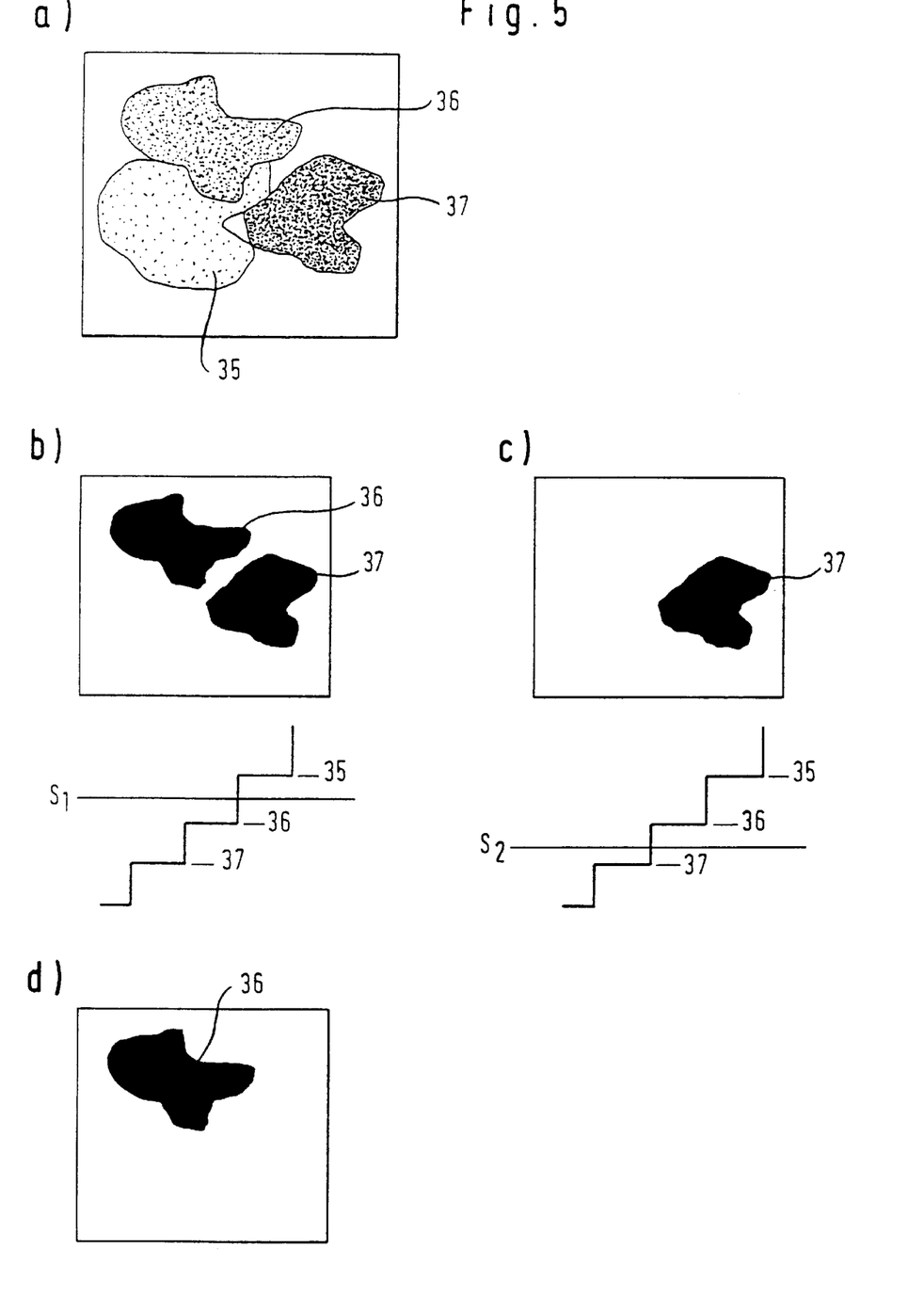

Should the sensor arrangement of FIG. 4 be equipped with photosensitive cells in accordance with the invention, which are suitable for the distinguishing of different gray tones, then the image of an object in accordance with FIG. 5a can, for example, be evaluated in different ways:

The object in accordance with FIG. 5a has three regions of different brightness, with the region 35 being the brightest and the region 37 being the darkest. The brightness of the region 36 lies between the brightness levels of the two regions 35 and 37.

A sensor arrangement in accordance with the invention can be so programmed or set that it only recognizes those objects or object regions which have a brightness which lies above or below a threshold value or between two threshold values. This is illustrated with respect to FIGS. 5b to d, which all show images of the object of FIG. 5a delivered by a sensor arrangement in accordance with the invention, with respectively different operating modes of the sensor arrangement being set.

An image in accordance with FIG. 5b is, for example, delivered when the sensor arrangement is set in such a way that those brightness levels of the object which lie beneath a threshold value $S_1$ lead to an image recognition. In the illustrated embodiment the brightness levels of the object regions 36 and 37 lie beneath the threshold value $S_1$, whereas the brightness of the object region 35 lies above this threshold value. The ratio of the brightness levels of the regions 35, 36 and 37 to the threshold value $S_1$ is illustrated by the stair signal, and also by the drawn in threshold value $S_1$ in accordance with FIG. 5b. The first step of the stair signal corresponds to the dark object region 37, the second step corresponds to the middle object region 36, and the third step corresponds to the bright object region 35.

FIG. 5b shows that with the named threshold setting only the object regions 36 and 37 are recognized, whereas light reflected from the background and from the object region 35 does not lead to the transmission of a corresponding light signal.

Thus, the image of FIG. 5b only contains the contours of the object regions 36 and 37.

FIG. 5c illustrates a type of operation of the sensor of the invention, in which a low threshold value $S_2$ is set so that ultimately only the darkest object region 37 is recognized.

Alternatively, a mode of operation of the sensor of the invention is also possible, in which only such object regions are recognized of which the brightness lies between the two threshold values $S_1$ and $S_2$. The image of the object in accordance with FIG. 5a delivered by such a mode of operation is illustrated in FIG. 5d. Only the object region 36 has a brightness which lies between the two threshold values $S_1$ and $S_2$, so that only this object region 36 is shown.

| REFERENCE NUMERAL LIST | |
|---|---|
| 1 | photodiode |
| 2 | current source |
| 3 | regulator |
| 4 | filter |
| 5 | filter |
| 6 | switch |
| 7 | switch |
| 8 | capacitor |
| 9 | switch |
| 10 | switch |
| 10' | switch |
| 11 | amplifier |
| 12 | sample-and-hold circuit |
| 13 | sensor arrangement |
| 14 | optical transmitting system |

-continued

REFERENCE NUMERAL LIST

| | |
|---|---|
| 15 | optical receiving system |
| 16 | plane |
| 17 | reflector |
| 18 | object |
| 19 | line of light |
| 20 | course of the line of light |
| 21 | sensor arrangement |
| 22 | autocollimation optical system |
| 23 | light beam |
| 24 | reflector |
| 25 | position |
| 26 | position |
| 27 | band |
| 28 | reflector region |
| 29 | reflector region |
| 30 | sensor arrangement |
| 31 | light bundle |
| 32 | reflector |
| 33 | object |
| 34 | switch |
| 35 | object region |
| 36 | object region |
| 37 | object region |
| P | potential point |

What is claimed is:

1. Optoelectronic sensor arrangement comprising a light transmitter for the transmission of sequential operational light pulses into a monitored region and a light receiver unit for the reception of operational light pulses reflected from an object located in the monitored region, characterized in that the light receiver unit includes at least two photosensitive elements (1), with a circuit for the suppression of stray light being associated with each photosensitive element (1).

2. Optoelectronic sensor arrangement in accordance with claim 1, characterized in that a plurality of photosensitive elements (1) are arranged in a row or in a matrix.

3. Optoelectronic sensor arrangement in accordance with claim 1, characterized in that each of the circuits for the suppression of stray light has a regulated energy source, in particular a current source (2) associated with the respective photosensitive element (1).

4. Optoelectronic sensor arrangement in accordance with claim 3, characterized in that the regulation of the energy source (2) can be switched on in the pauses between the transmission of the operational light pulses and can be switched off during the transmission of the operational light pulses.

5. Optoelectronic sensor arrangement in accordance with claim 3, characterized in that the regulation can be varied at the times of the transmission of the operational light pulse relative to the regulation in the pauses between the transmission of the operational light pulses.

6. Optoelectronic sensor arrangement in accordance with claim 5, characterized in that the change of the regulating behavior can be brought about by activation and deactivation of at least one filter (5) of a regulating circuit (2–6).

7. Optoelectronic sensor arrangement in accordance with claim 6, characterized in that a filter (5) with a shorter time constant can be activated in the pauses between the transmission of the operational light pulses, while a filter (4) with a longer time constant can be activated during the transmission of the operational light pulses.

8. Optoelectronic sensor arrangement in accordance with claim 1, characterized in that each of the circuits for the suppression of stray light has a storage element (8) for the storage of the operational light component received by the photosensitive element (1).

9. Optoelectronic sensor arrangement in accordance with claim 8, characterized in that the storage element is formed as a capacitor (8).

10. Optoelectronic sensor arrangement in accordance with claim 8, characterized in that the storage element (8) can be coupled via a switch (7) to the photosensitive element (1) during the reception of the operational light pulses.

11. Optoelectronic sensor arrangement in accordance with claim 10, characterized in that all storage elements (8) can be simultaneously coupled to the photosensitive elements (1) respectively associated with them.

12. Optoelectronic sensor arrangement in accordance with claim 8, characterized in that the storage element (8) is coupled to a reset circuit (9) which can be activated during the pauses between the transmission of the operational light pulses.

13. Optoelectronic sensor arrangement in accordance with claim 8, characterized in that the storage element (8) can be connected via a switch, in particular via an addressable switch (10, 10') to a sample-and-hold circuit (12), to a comparator circuit or to an A/D-converter.

14. Optoelectronic sensor arrangement in accordance with claim 13, characterized in that the threshold value of the comparator circuit can be repeatedly adjustable, in particular in the context of a teaching procedure.

15. Optoelectronic sensor arrangement with a light transmitter for the transmission of sequential operational light pulses into a monitored region and a light receiver unit for the reception of operational light pulses reflected at an object located in the monitored region, wherein the light receiver unit includes a photosensitive element (1), with which a circuit for the suppression of stray light is associated, characterized in that the circuit is designed in accordance with claim 3.

16. Optoelectronic sensor arrangement in accordance with claim 1, characterized in that all photosensitive elements (1) of the light receiver unit are arranged on a single chip.

17. Optoelectronic sensor arrangement in accordance with claim 16, characterized in that all circuits for the suppression of stray light (2 to 12) are arranged on the same chip as the photosensitive elements (1) associated with them.

18. Optoelectronic sensor arrangement in accordance with claim 1, characterized in that the photosensitive elements (1) of the light receiver unit are spaced equidistanly from one another or are arranged bordering on one another.

19. Optoelectronic sensor arrangement in accordance with claim 1, characterized in that the color filters, in particular color filters of adjustable transmission frequency, are provided in front of the photosensitive elements (1).

20. Method for the operation of an optoelectronic sensor arrangement in accordance with claim 2, characterized in that the movement, the vertical profile including any possibly oblique flanks and/or the contrast of an object located in the monitored region (18, 27) is found by means of an evaluation circuit.

21. Method in accordance with claim 20, characterized in that the object (18, 27) is actively illuminated, in particular with a defined light intensity and/or with light of a defined wavelength range.

22. Method in accordance with claim 20, characterized in that a reflector (24) bounding the monitored region reflects transmitted light to the light receiver unit.

23. Method in accordance with claim 22, characterized in that the reflector (24) which bounds the monitored region is aligned relative to the sensor arrangement (13, 21), in that the reflector (24) is pivoted and/or shifted with the object-free monitored region until all the photosensitive elements signalize the reception of light.

24. Use of an apparatus or of a method in accordance with claim 2, wherein the sensor is operated in accordance with the light intersect method for the determination of the presence, the position, the size, the height and/or the overall profile of an object (18).

25. Use of an apparatus or of a method in accordance with claim 2 for the regulation of the catenary deflection of an in particular flexible object (27).

26. Use of an apparatus or of a method in accordance with claim 2 for the determination of the distance between two objects, in particular two objects transported on a conveyor means.

27. Use of an apparatus or of a method in accordance with claim 2 for the determination of the width, length or size of an object, in particular an object transported on a conveyor means.

28. Use of an apparatus or of a method in accordance with claim 2 for the monitoring of a stationary state, in particular the position of one or more objects.

29. Use of an apparatus or of a method in accordance with claim 2 for the recognition of one or more objects or object features with respect to their reflectivity, their shape, their dimensions and/or their contour.

30. Use of an apparatus or of a method in accordance with claim 2 for the recognition of one or two dimensional codes, in particular of a bar code or of a script.

\* \* \* \* \*